US012770477B1

(12) United States Patent
Gorja et al.

(10) Patent No.: US 12,770,477 B1
(45) Date of Patent: Oct. 20, 2026

(54) SYSTEM AND METHOD FOR OFFLINE PROTECTION OF AUTOMATED TELLER MACHINES (ATMS)

(71) Applicant: Bank of America Corporation, Charlotte, NC (US)

(72) Inventors: Dharma Rao Gorja, Charlotte, NC (US); Abhijit Behera, Hyderabad (IN); Gowri Sundar Suriyanarayanan, Chennai (IN); Maneesh Kumar Sethia, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 19/413,962

(22) Filed: Dec. 9, 2025

(51) Int. Cl.
*G07F 19/00* (2006.01)

(52) U.S. Cl.
CPC .......... *G07F 19/209* (2013.01); *G07F 19/207* (2013.01); *G07F 19/211* (2013.01)

(58) Field of Classification Search
CPC ................. G07F 19/207; G07F 19/211; G06Q 10/06393; G06Q 10/063114; G06Q 20/1085; G06Q 20/401
USPC ....... 235/379, 375; 705/7.39, 7.11, 7.38, 43, 705/39
See application file for complete search history.

(56) References Cited

U.S. PATENT DOCUMENTS 7,461,086 B1 12/2008 Hurren et al.
7,461,096 B1 12/2008 Hurren et al.
7,542,988 B1 6/2009 Cook et al.
7,757,291 B2 7/2010 Rochette et al.
7,877,413 B1 1/2011 Cook et al.
7,886,291 B1 2/2011 Jones et al.
7,945,897 B1 5/2011 Cook
7,970,789 B1 6/2011 Blaser et al.
8,825,994 B2 9/2014 Heidingsfeld et al.
8,839,228 B2 9/2014 Thorat et al.
8,843,903 B1 9/2014 Blaser et al.
9,405,521 B2 8/2016 Ou-Yang et al.
9,672,078 B2 6/2017 Kacin et al.
9,804,789 B2 10/2017 Uriel
10,101,915 B2 10/2018 Uriel
10,223,413 B2 3/2019 Adler et al.
2006/0184931 A1 8/2006 Rochette et al.
2006/0265756 A1 11/2006 Campbell et al.
2012/0246634 A1 9/2012 Wright et al.
2017/0364353 A1 12/2017 Adler et al.
(Continued)

*Primary Examiner* — Edwyn Labaze

(57) ABSTRACT

A plurality of attributes are recorded relating to a first execution environment at a server, and it is determined, based on monitoring, that the server uses an AI agent to validate a first parameter. When an ATM unit loses connectivity to the server, an AI agent trained to validate the first parameter is identified. An LLM associated with the AI agent is selected, and the AI agent and LLM are added to a software container. A second execution environment, associated with the same attributes as the first execution environment, is determined. The AI agent, software container, and second execution environment are bundled into a software package that is transmitted to the ATM unit, where the second execution environment is deployed, and the AI agent and LLM operate to replicate server functionality at the ATM unit. This enables continued validation during disconnection without requiring persistent network access or server availability.

20 Claims, 4 Drawing Sheets

(56) References Cited

U.S. PATENT DOCUMENTS

| | | | | |
|---|---|---|---|---|
| 2025/0335889 | A1* | 10/2025 | Baker | G06Q 20/3224 |
| 2026/0024035 | A1* | 1/2026 | DiGangi | G06Q 10/06315 |
| 2026/0093491 | A1* | 4/2026 | Khan | G06F 9/3017 |
| 2026/0104861 | A1* | 4/2026 | Donlan | G06F 8/35 |

* cited by examiner

SYSTEM AND METHOD FOR OFFLINE PROTECTION OF AUTOMATED TELLER MACHINES (ATMS)

TECHNICAL FIELD

The present disclosure relates generally to network security, and more specifically to a system and method for offline protection of Automated Teller Machines (ATMs).

BACKGROUND

Automated Teller Machine (ATM) units are frequent targets of cyber and physical attacks due to the sensitive data they handle and their often outdated or isolated computing environments. Because ATMs often operate in remote or difficult-to-access locations, deploying security patches and updated software in a timely manner is logistically challenging. Further, deploying software (e.g., defensive software and software patches) across ATM units is often constrained by the heterogeneous nature of their execution environments. In addition, loss of connectivity to a validation server may leave an ATM unit vulnerable to attacks.

SUMMARY

The system and method implemented by the system as disclosed in the present disclosure provide technical solutions to the technical problems discussed above by implementing a framework that can efficiently deploy defensive software across Automated Teller Machine (ATM) units with heterogeneous execution environments. In addition, the disclosed framework allows for offline defense of ATM units.

The disclosed system and method provide several practical applications and technical advantages over conventional systems and methods. For example, the disclosed system and method provides the practical application of deploying defensive AI agents across ATM units with heterogeneous execution environments.

ATM units 120 are frequent targets of cyber and physical attacks due to the sensitive data they handle and their often outdated or isolated computing environments. Common vulnerabilities arise from outdated operating systems, unpatched software, weak network configurations, and insecure communication channels between the ATM and the bank's backend servers. Attackers take advantage of these weaknesses through various means, including malware injection (such as "jackpotting" attacks that force the ATM to dispense cash), skimming devices that capture card and PIN data, network-based attacks that intercept or modify transaction messages, and physical access targeting unencrypted hard drives or USB ports. Because ATMs often operate in remote or difficult-to-access locations, deploying security patches and updated software in a timely manner is logistically challenging. When security software updates are delayed, ATMs remain exposed to known vulnerabilities that attackers can easily take advantage of using publicly available tools or previously developed malware variants. This lag in patch management effectively extends the attack surface, allowing threat actors to compromise large numbers of machines through coordinated campaigns. Consequently, the inability to rapidly install and verify security updates significantly heightens the risk of financial loss, data breaches, and reputational damage to financial institutions.

Deploying software (e.g., defensive software and software patches) across ATM units is often constrained by the heterogeneous nature of their execution environments. ATMs from different manufacturers and generations typically operate on diverse hardware configurations, such as varying processors, peripheral controllers, and card reader interfaces, each requiring specific drivers and communication protocols. Moreover, differences in operating systems ranging from legacy versions of Windows Embedded or OS/2 to modern Linux-based systems create compatibility challenges for software updates and uniform functionality. Firmware variations across ATM components, including cash dispensers, keypads, and sensors, further complicate integration and testing. In addition, vendor-specific software stacks and middleware can restrict interoperability and necessitate customized deployment procedures or wrappers for each vendor's platform. These disparities lead to fragmented deployment pipelines, increased maintenance costs, and greater testing complexity, as software must be validated separately for each unique environment. As a result, ensuring consistent performance, security, and regulatory compliance across a network of heterogeneous ATM units becomes a resource-intensive and error-prone process.

Embodiments of the present disclosure describe improved techniques to deploy software (e.g., defensive AI agents) across heterogeneous ATM units. As described in embodiments of the present disclosure, the disclosed techniques include identifying and deploying software that is customized to the particular software/execution environment of ATM units to ensure that the software deployed at each ATM unit is fully compatible with the local execution environment at that ATM unit and runs efficiently and error free. Further, the disclosed techniques allow for mass deployment of software across large fleets of ATM units with heterogeneous execution environments in an efficient, controlled and error free manner.

For example, as described in accordance with embodiments of the present disclosure, a security manager may be configured to deploy software (e.g., defensive AI agents) at one or more ATM units. As described in more detail below, security manager may be configured to identify and deploy an AI agent at an ATM unit such that the deployed AI agent is fully compatible with the local software environment (e.g., execution environment) at that ATM unit to allow the deployed AI agent to operate error free at the ATM unit. In operation, in response to receiving a request to protect a particular ATM unit against a particular unauthorized activity, security manager determines a particular AI agent that is trained/configured to defend/protect ATM units against the particular unauthorized activity indicated in the request and determines a particular LLM that is associated with the particular AI agent. Security manager then determines a software container that includes software elements needed to execute the particular AI agent and the associated LLM and adds the determined AI agent and the LLM to the software container. Security manager then determines which particular entity manufactured and/or services the particular ATM unit for which the request was received and accordingly determines a particular execution environment associated with the particular entity. Security manager generates a software package that bundles the software container (containing the particular AI agent and LLM) and the particular execution environment. Security manager transmits the software package to the particular ATM unit, deploys the execution environment form the package at the ATM unit and deploys the software container in the execution environment at the ATM unit. Security manager may then execute the AI agent and LLM from the software container to defend the ATM unit against the particular unauthorized activity. Thus, security manager generates and deploys software at the ATM unit that is customized to and compatible with the local execution environment at that ATM unit.

In some cases, a central server may be responsible to perform several operations (e.g., parameter validations) relating to operations and interactions at an ATM unit. For example, central server may be configured to validate certain security-related parameters associated with operation of a defensive AI agent deployed at an ATM unit to protect that ATM unit from an unauthorized activity. Central server may play a critical role in validating security-related parameters and detecting or blocking potential attacks against the ATM unit. For example, central server validates the cryptographic integrity of software modules, verify the authenticity of firmware versions, or compare operational fingerprints of an ATM unit against known baselines to detect unauthorized modifications. These validations allow a defensive AI agent to determine whether an unauthorized activity has taken place at a respective ATM unit and measures/actions that need to be taken to block and/or avoid an unauthorized activity. For example, when suspicious activity is detected, based at least in part on the validations performed by the central server, such as unusual transaction sequences, communication with unverified endpoints, or deviations in system behavior, an AI agent can issue commands to restrict access, disable specific functions, or isolate the ATM unit from the network to prevent further compromise.

Thus, communication with the central server may be an integral part of a defensive AI agent performing its operations at an ATM unit 120. Without connectivity to the central server, an AI agent deployed at an ATM unit is unable to validate security parameters that are generally validated by the central server. This may mean that the AI agent is unable to identify, avoid and block unauthorized activities leaving the ATM unit vulnerable to attacks.

As described in accordance with embodiments of the present disclosure, when an ATM unit loses connectivity to the central server, security manager may be configured to replicate the behavior of the central server or a portion thereof locally at that ATM unit such that validations otherwise performed by the central server can be performed locally at the ATM unit using the replicated central server. This allows defensive AI agents deployed at the ATM unit to perform their respective defensive operations even when the ATM unit 120 has lost connectivity to the central server.

Deploying defensive software such as defensive AI agents that is fully compatible with the local execution environment of each ATM unit significantly enhances data security by ensuring that the security mechanisms operate reliably and without interruption. When defensive AI agents are aligned with the ATM's native operating system, firmware versions, device drivers, and vendor-specific middleware, they are able to monitor system behavior, hardware interactions, and transaction flows with high precision and minimal latency. Full compatibility allows these agents to access device-level telemetry, cryptographic modules, and system logs without encountering permission issues, interface conflicts, or incomplete data feeds, all of which are critical for detecting unauthorized activity. Moreover, compatible security software avoids execution errors or performance bottlenecks that attackers could use to bypass or disable security functions. It also ensures that the AI agents can integrate seamlessly with existing authentication modules, encryption libraries, and tamper-detection mechanisms, thereby strengthening the overall security posture of the ATM. As a result, defensive AI agents operating within a fully compatible local environment are more effective at identifying anomalies, blocking suspicious actions in real time, and maintaining continuous protection against evolving threats ultimately improving the integrity and confidentiality of data processed at the ATM.

Further, deploying software that is fully compatible with the local execution environment of each ATM unit significantly enhances the performance, reliability, and overall efficiency of individual ATM units and the overall ATM network. When software aligns with the specific operating system, firmware, hardware components, and middleware present at an ATM, it can utilize system resources more effectively, resulting in faster processing of transactions and smoother operation of hardware peripherals such as card readers, keypads, and cash dispensers. Compatibility minimizes software conflicts, driver mismatches, and execution errors that could otherwise cause latency, failed transactions, or system crashes. It also reduces the computational overhead required for emulation or translation layers, thereby optimizing CPU and memory usage. Furthermore, compatible software enables more stable integration with local device management and monitoring tools, improving fault detection and recovery time. As a result, customers experience quicker transaction responses and fewer service interruptions, while institutions benefit from reduced maintenance costs and higher network uptime. In essence, compatibility between deployed software and the native execution environment ensures seamless operation, enhances security stability, and extends the operational lifespan of ATM hardware.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
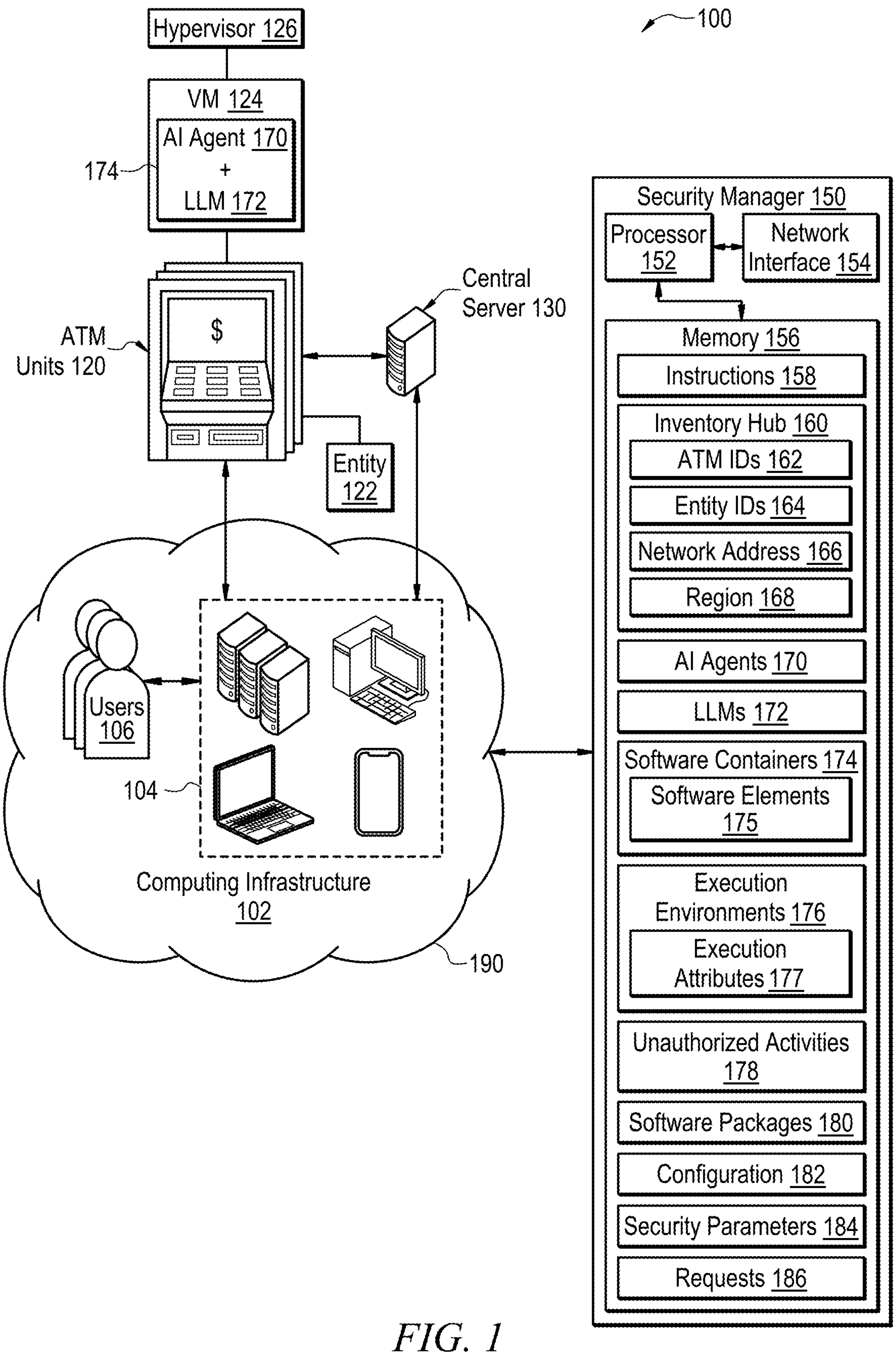
FIG. 1 is a schematic diagram of a system, in accordance with one or more embodiments of the present disclosure.

FIG. 1 is a schematic diagram of a system 100, in accordance with certain aspects of the present disclosure. As shown, system 100 includes a computing infrastructure 102 connected to a network 190. Computing infrastructure 102 may include a plurality of hardware and software components. The hardware components may include, but are not limited to, computing nodes 104 such as desktop computers, smartphones, tablet computers, laptop computers, data servers and data centers, mainframe computers, virtual reality (VR) headsets, augmented reality (AR) glasses and other hardware devices such as printers, routers, hubs, switches, and memory all connected to the network 190. In one embodiment, computing nodes 104 of the computing infrastructure 102 may Automated Teller Machine (ATM) units 120. Software components may include software applications that are run by one or more of the computing nodes 104 including, but not limited to, operating systems, user interface applications, third party software, database management software, service management software, mainframe software, metaverse software, AI tools and other customized software programs (e.g., security manager 150) implementing particular functionalities. For example, software code relating to one or more software applications may be stored in a memory device and one or more processors (e.g., belonging to one or more computing nodes 104) may execute the software code to implement respective functionalities. An example software application run by one or more computing nodes 104 of the computing infrastructure 102 may include the security manager 150. In one embodiment, at least a portion of the computing infrastructure 102 may be representative of an Information Technology (IT) infrastructure of an organization.

One or more of the computing nodes 104 may be operated by a user 106. In this context, a computing node 104 operated by a user may be referred to as a user device. For example, a computing node 104 may provide a user interface using which a user 106 may operate the computing node 104 to perform data interactions within the computing infrastructure 102. The term "computing node 104" may be replaced by "user device" in this disclosure when the computing node 104 is operated by a user 106.

One or more computing nodes 104 of the computing infrastructure 102 may be representative of a computing system which hosts software applications that may be installed and run locally or may be used to access software applications running on a server. The computing system may include mobile computing systems including smart phones, tablet computers, laptop computers, or any other mobile computing devices or systems capable of running software applications and communicating with other devices. The computing system may also include non-mobile computing devices such as desktop computers or other non-mobile computing devices capable of running software applications and communicating with other devices. In certain embodiments, one or more of the computing nodes 104 may be representative of a server running one or more software applications to implement respective functionality as described below. In certain embodiments, one or more of the computing nodes 104 may run a thin client software application where the processing is directed by the thin client but largely performed by a central entity such as a server (not shown).

Network 190, in general, may be a wide area network (WAN), a personal area network (PAN), a cellular network, or any other technology that allows devices to communicate electronically with other devices. In one or more embodiments, network 190 may be the Internet.

Often computing systems (e.g., computing nodes 104) that store, process, or handle sensitive data in some manner are prone to cyber-attacks or data breaches in which a hacker gains unauthorized access to the computing systems and data stored on the computing systems. The term "cyber-attack" is often used interchangeably with the term "data breach" and refers to any security incident in which unauthorized parties access computing systems and sensitive or confidential information, including but not limited to, Non-Public Information (NPI), Personal Identification Information (PII), Production Information, or any other data that is designated as sensitive data.

In one example, a data breach may include unauthorized installing of malicious software code (e.g., malware) at a computing device (e.g., data server), wherein the malicious software is configured to perform malicious activities to disrupt an operation of the computing device, for example, by creating unwanted files to slow down the speed and performance of the computing device, corrupting files, or crashing some software or executable applications so that they cannot be executed. A malware can infect many types of devices, including cell phones, computers, tables, and smart televisions. It usually spreads by duplicating itself and hiding in a device's data files. A malware attack often results in compromised computing performance by causing slow processor performance, browser redirects, frequent infection warnings, frequent pop-up ads, problems starting up and shutting down a computing node, sudden loss of memory disk space, repeated system crashes and freezes, disabled security features, changes in file name and sizes, programs opening and closing themselves, or a combination thereof. In some cases, a malware locks up networks and computing nodes making them unusable. In another example, a data breach may include access to sensitive data, such as personal information without authorization. In another example, a data breach may exfiltrate data by transmitting confidential data to unauthorized devices. In some cases, the stolen data may be used to perform other unauthorized data interactions within the computing infrastructure and to gain access to other computing nodes.

ATM units 120 are frequent targets of cyber and physical attacks due to the sensitive data they handle and their often outdated or isolated computing environments. Common vulnerabilities arise from outdated operating systems, unpatched software, weak network configurations, and insecure communication channels between the ATM and the bank's backend servers. Attackers use these weaknesses through various means, including malware injection (such as "jackpotting" attacks that force the ATM to dispense cash), skimming devices that capture card and PIN data, network-based attacks that intercept or modify transaction messages, and physical access targeting unencrypted hard drives or USB ports. Because ATMs often operate in remote or difficult-to-access locations, deploying security patches and updated software in a timely manner is logistically challenging. When security software updates are delayed, ATMs remain exposed to known vulnerabilities that attackers can easily take advantage of using publicly available tools or previously developed malware variants. This lag in patch management effectively extends the attack surface, allowing threat actors to compromise large numbers of machines through coordinated campaigns. Consequently, the inability to rapidly install and verify security updates significantly heightens the risk of financial loss, data breaches, and reputational damage to financial institutions.

Deploying software (e.g., defensive software and software patches) across ATM units is often constrained by the heterogeneous nature of their execution environments. ATMs from different manufacturers and generations typically operate on diverse hardware configurations, such as varying processors, peripheral controllers, and card reader interfaces, each requiring specific drivers and communication protocols. Moreover, differences in operating systems ranging from legacy versions of Windows Embedded or OS/2 to modern Linux-based systems create compatibility challenges for software updates and uniform functionality. Firmware variations across ATM components, including cash dispensers, keypads, and sensors, further complicate integration and testing. In addition, vendor-specific software stacks and middleware can restrict interoperability and necessitate customized deployment procedures or wrappers for each vendor's platform. These disparities lead to fragmented deployment pipelines, increased maintenance costs, and greater testing complexity, as software must be validated separately for each unique environment. As a result, ensuring consistent performance, security, and regulatory compliance across a network of heterogeneous ATM units 120 becomes a resource-intensive and error-prone process.

Embodiments of the present disclosure describe improved techniques to deploy software (e.g., AI agents 170) across heterogeneous ATM units 120. As described in embodiments of the present disclosure, the disclosed techniques include identifying and deploying software that is customized to the particular software/execution environment of ATM units 120 to ensure that the software deployed at each ATM unit 120 is fully compatible with the local execution environment at that ATM unit 120 and runs efficiently and error free. Further, the disclosed techniques allow for mass deployment of software across large fleets of ATM units 120 with heterogeneous execution environments in an efficient, controlled and error free manner.

As shown in FIG. 1, the computing infrastructure 102 may include a plurality of ATM units 120. In one embodiment, each ATM unit 120 is a computing node 104 of the computing infrastructure 102. The plurality of ATM units 120 may include ATM units 120 having heterogeneous execution environments. For example, the plurality of ATM units 120 may include different sets of ATM units 120, wherein each set of ATM units 120 is manufactured by and/or serviced by a different entity 122 (e.g., different manufacturer/vendor).

ATM units 120 manufactured and serviced by different vendors often operate within distinct and non-uniform software environments due to variations in design philosophy, component selection, and maintenance practices. Each manufacturer typically provides proprietary system software, middleware, and device drivers tailored to its specific hardware architecture and peripheral interfaces, such as cash dispensers, card readers, and keypads. These software environments may rely on different operating systems ranging from Windows Embedded and Linux to vendor-customized real-time operating systems and incorporate unique firmware versions optimized for vendor-specific hardware components. Furthermore, service providers responsible for maintaining these ATMs may deploy additional management or monitoring software that differs across networks, resulting in inconsistent system configurations and update mechanisms. Even within the same financial institution, ATMs sourced from multiple vendors or maintained by third-party providers may operate under different security protocols, logging frameworks, and communication stacks. This diversity creates challenges in ensuring interoperability, applying uniform updates, and maintaining consistent security postures across all machines in the network, ultimately increasing operational complexity and the potential for configuration errors or unpatched vulnerabilities.

Software installed on a particular ATM unit 120 must be fully compatible with the unit's native software/execution environment to ensure reliable operation and maintain compliance with security and functional requirements. Each ATM unit's software environment consists of a tightly integrated stack that includes the operating system, device drivers, firmware, middleware, and vendor-specific applications that manage hardware components such as card readers, cash dispensers, and keypads. Because these components interact through proprietary interfaces and communication protocols, any new or updated software must align with the existing versions, configurations, and dependencies of the underlying system. Incompatibility can lead to failures in critical functions such as cash dispensing, card reading, or secure PIN entry or cause conflicts that degrade performance or compromise security. Additionally, variations in operating systems and firmware across ATM models require that software updates be specifically adapted, tested, and certified for each environment to avoid system instability or regulatory noncompliance. Therefore, ensuring compatibility between installed software and the ATM's native software environment is essential for preserving system integrity, transaction reliability, and customer trust.

In one or more embodiments, software installed at an ATM unit 120 may include one or more Artificial Intelligence (AI) agents 170. Generally, an AI agent (e.g., AI agent 170) is an autonomous or semi-autonomous software system designed to perceive its environment, reason about the information it receives, and take actions toward achieving specific goals. It typically operates by continuously sensing data inputs such as text, images, or sensor signals processing that information using artificial intelligence techniques like machine learning or natural language understanding and making decisions or performing tasks based on its analysis. AI agents can range from simple rule-based systems that follow predefined instructions to advanced adaptive agents capable of learning from experience and improving their performance over time. In one embodiment, an AI agent 170 deployed at a particular ATM unit 120 may be a defensive AI agent 170 trained/configured to avoid, detect, predict, and/or block an unauthorized activity 178 at the ATM unit 120. Unauthorized activities 178 at an ATM unit 120 may include, but are not limited to malware injection, capturing card or PIN data using skimming devices, network-based attacks to intercept or modify transaction messages, and physical attacks including damage to the ATM unit or components thereof.

In one or more embodiments, an ATM unit 120 may be communicatively coupled to a central server 130 which may be responsible to perform several operations (e.g., parameter validations) relating to operations and interactions at the ATM unit 120. In one embodiment, central server 130 is part of the computing infrastructure 102 (e.g., a computing node 104). In one embodiment, central server 130 may be configured to validate certain security-related parameters (e.g., security parameters 184) associated with operation of a defensive AI agent 170 deployed at an ATM unit 120. Central server 130 may play a critical role in validating security-related parameters (e.g., security parameters 184) and detecting or blocking potential attacks against the ATM unit 120. For example, central server 130 validates the cryptographic integrity of software modules, verify the authenticity of firmware versions, or compare operational fingerprints of an ATM unit 120 against known baselines to detect unauthorized modifications. These validations allow a defensive AI agent 170 to determine whether an unauthorized activity 178 has taken place at a respective ATM unit 120 and measures/actions that need to be taken to block and/or avoid an unauthorized activity 178. For example, when suspicious activity is detected, based at least in part on the validations performed by the central server 130, such as unusual transaction sequences, communication with unverified endpoints, or deviations in system behavior, an AI agent 170 can issue commands to restrict access, disable specific functions, or isolate the ATM unit 120 from the network to prevent further compromise.

At least a portion of the computing infrastructure 102 (e.g., one or more computing nodes 104) may implement a security manager 150 which may be configured to deploy software (e.g., AI agents 170) at one or more ATM units 120, in accordance with one or more embodiments of the present disclosure. Security manager 150 includes a processor 152, a memory 156, and a network interface 154. Security manager 150 may be configured as shown in FIG. 1 or in any other suitable configuration.

The processor 152 includes one or more processors operably coupled to the memory 156. The processor 152 is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 152 may be a programmable logic device, a microcontroller, a microprocessor, or any suitable combination of the preceding. The processor 152 is communicatively coupled to and in signal communication with the memory 156. The one or more processors are configured to process data and may be implemented in hardware or software. For example, the processor 152 may be 8-bit, 16-bit, 32-bit, 64-bit or of any other suitable architecture. The processor 152 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions, such as software instructions. For example, the one or more processors are configured to execute instructions 158 to implement the security manager 150. In this way, processor 152 may be a special-purpose computer designed to implement the functions disclosed herein. In one or more embodiments, the security manager 150 is implemented using logic units, FPGAs, ASICs, DSPs, or any other suitable hardware. The security manager 150 is configured to operate as described with reference to FIGS. 1-3. For example, the processor 152 may be configured to perform at least a portion of method 200 and method 300 as described with reference to FIGS. 2, 3A and 3B respectively.

The memory 156 includes a non-transitory computer-readable medium such as one or more disks, tape drives, or solid-state drives, and may be used as an over-flow data storage device, to store programs when such programs are selected for execution, and to store instructions and data that are read during program execution. The memory 156 may be volatile or non-volatile and may include a read-only memory (ROM), random-access memory (RAM), ternary content-addressable memory (TCAM), dynamic random-access memory (DRAM), and static random-access memory (SRAM).

The memory 156 is operable to store the instructions 158, an inventory hub 160 including information relating to a list of ATM units 120 (e.g., ATM IDs 162, entity IDs 164 of entities 122 that manufactured and/or service each ATM unit 120, network addresses 166 of the ATM units 120, region 168 where each ATM unit 120 is located), images AI agents 170, images of Large Language Models (LLMs) 172), software containers 174 including software elements 175 needed to execute AI agents 170, images of execution environments 176 (including execution attributes 177), unauthorized activities 178 that can occur at ATM units 120, software packages 180 generated by security manager 150, configuration 182 associated with ATM units 120, security parameters 184 validated by central server 130, and any other data needed to perform operations of the security manager 150 as described in embodiments of the present disclosure. The instructions 158 may include any suitable set of instructions, logic, rules, or code operable to execute the security manager 150.

The network interface 154 is configured to enable wired and/or wireless communications. The network interface 154 is configured to communicate data between the security manager 150 and other devices, systems, or domains (e.g., computing nodes 104, ATM units 120, central server 130 etc.). For example, the network interface 154 may include a Wi-Fi interface, a LAN interface, a WAN interface, a modem, a switch, or a router. The processor 152 is configured to send and receive data using the network interface 154. The network interface 154 may be configured to use any suitable type of communication protocol as would be appreciated by one of ordinary skill in the art.

It may be noted that each of the computing nodes 104 including ATM units 120 and central server 130 may be implemented like the security manager 150 shown in FIG. 1. For example, each of the computing nodes 104 including each ATM units 120 and central server 130 may have a respective processor and a memory that stores data and instructions to perform a respective functionality.

As noted above, security manager 150 may be configured to deploy software (e.g., AI agents 170) at one or more ATM units 120. As described in more detail below, security manager 150 may be configured to identify and deploy an AI agent 170 at an ATM unit 120 such that the deployed AI agent 170 is fully compatible with the local software environment (execution environment 176) at that ATM unit 120 to allow the deployed AI agent 170 to operate error free at the ATM unit 120.

In one or more embodiments, security manager 150 is configured to store (e.g., in memory 156) or has access to an inventory hub 160, a plurality of AI agents 170 (stored as images of AI agents 170), a plurality of LLMs 172 (stored as images of LLMs 172), a plurality of software containers 174 (stored as images of software containers 174), and a plurality of execution environments 176 (stored as images of execution environments 176).

Each AI agent 170 (of the plurality of images of AI agents 170) is configured to defend against a particular unauthorized activity 178 that may occur at or in relation to an ATM unit 120. For example, each AI agent 170 is trained/configured to avoid, detect, predict, and/or block an unauthorized activity 178 at the ATM unit 120. Unauthorized activities 178 at an ATM unit 120 may include, but are not limited to malware injection, capturing card or PIN data using skimming devices, network-based attacks to intercept or modify transaction messages, and physical attacks including damage to the ATM unit or components thereof.

Each LLM 172 (of the plurality of images of LLMs 172) is a type of AI model trained on vast amounts of text data to understand and generate human-like language. An AI agent 170 needs an LLM 172 to perform its operation. An LLM 172 is like a reasoning engine that can be embedded inside an AI agent 170. An LLM 172 provides understanding, reasoning, and language generation and can interpret queries, plan steps, and explain results. An AI agent 170 wraps the LLM 172 into a system that can perceive, reason, and act such as retrieving data, executing code, browsing the web, or interacting with users. So, while the LLM 172 provides intelligence and language understanding, the AI agent 170 adds autonomy, context-awareness, and the ability to interact with the real or digital world. In other words, each AI agent 170 is associated with an LLM 172 that provides understanding and reasoning capabilities to the AI agent 170.

Each software container 174 (of the plurality of images of software containers 174) includes software elements 175 needed to execute a particular AI agent 170 and an associated LLM 172. Each software container 174 is a lightweight, portable unit that packages an application (e.g., AI agent 170 and associated LLM 172) together with software elements 175 the application needs to run including, but not limited to, software code, runtime, system tools, libraries, and configuration files (e.g., configuration 182). In other words, a software container 174 includes everything a particular AI agent 170 and associated LLM 172 need to run in an execution environment 176. A software container 174 isolates applications (e.g., AI agent 170 and associated LLM 172) from their environment (e.g., execution environment 176) so they can run reliably and consistently across different computing systems (e.g., having different execution environments 176). Essentially, a software container 174 allows an AI agent 170 to run in any execution environment 176. Each software container 174 is associated with a particular AI agent 170 and associated LLM 172 and includes all software elements 175 needed to execute the particular AI agent 170 and the associated LLM 172.

An execution environment (e.g., execution environment 176) generally provides a context in which an application (e.g., AI agent 170 and associated LLM 172) runs/executes. For example, an execution environment provides hardware (e.g., CPU memory storage etc.), operating system, dependencies and software libraries the application relies on, runtime components and configuration settings (e.g., network settings, database connections etc.) that the application needs to execute correctly. An example of an execution environment is a virtual machine (VM) 124 that may be deployed at an ATM unit 120 as further described in this disclosure. Each image of a particular execution environment 176 includes a plurality of execution attributes 177 that define the components of that execution environment 176 including, but not limited to, the hardware, operating system, dependencies and software libraries, runtime components and configuration settings. In one embodiment, each execution environment 176 defines a typical software/execution environment deployed at ATM units 120 manufactured by and/or serviced by a particular entity 122. As described above, the execution environments deployed at ATM units 120 manufactured by and/or serviced by different entities 122 may be different. Essentially, an image of each execution environment 176 (e.g., stored in memory 156) includes configuration defined by execution attributes 177 that can be used to replicate a typical software/execution environment deployed at ATM units 120 manufactured by and/or serviced by a particular entity 122.

In one embodiment, one or more of the inventory hub 160, the plurality of images of the AI agents 170, the plurality of images of the LLMs 172, the plurality of images of the software containers 174 or the plurality of images of the execution environments 176 are stored in a cloud server accessible by the security manager 150.

In operation, security manager 150 may be configured to receive requests 186 to protect/defend one or more ATM units 120 against particular unauthorized activities 178. A request 186 may be machine-generated or user-generated. For example, security manager 150 may receive a request 186 to protect a particular ATM unit 120 against a particular unauthorized activity 178. The particular unauthorized activity 178 may be a particular type of software breach, malware injection, or hardware attack (e.g., a new type of skimmer) the particular ATM unit 120 is found vulnerable to.

In response to receiving the request 186 to protect the particular ATM unit 120 against the particular unauthorized activity 178, security manager 150 accesses (e.g., from memory 156) the images of the plurality of AI agents 170 and identifies (from the plurality of AI agents 170), a particular AI agent 170 that is trained/configured to defend/protect ATM units 120 against the particular unauthorized activity 178 indicated in the request 186.

Once the particular AI agent 170 has been identified, security manager 150 accesses (e.g., from memory 156) the images of the plurality of LLMs 172 and identifies (from the plurality of LLMs 172) a particular LLM 172 that is associated with the identified particular AI agent 170. In other words, security manager 150 identifies the particular LLM 172 that is typically used by the particular AI agent 170 for its operation.

Additionally, security manager 150 accesses (e.g., from memory 156) the images of the plurality of software containers 174 and identifies (from the plurality of software containers 174) a particular software container 174 that includes typical software elements 175 to execute the particular AI agent 170 and associated LLM 172. In one embodiment, security manager 150 generates an updated image of the identified particular software container 174 based on the identified particular AI agent 170 and the particular LLM 172. For example, security manager 150 extracts (e.g., memory 156) an image of the particular AI agent 170, an image of the particular LLM 172 and an image of the particular software container 174. Security manager 150 then generates an updated image of the software container 174 by adding the particular AI agent 170 and the particular LLM 172 to the image of the software container 174.

In addition, security manager 150 may determine which entity manufactured and/or services the particular ATM unit 120 for which the request 186 was received. For example, the request 186 may include an ATM ID 162 of the particular ATM unit 120 that is to be protected. Security manager 150 may access inventory hub 160 and identify an entity ID 164 associated with a particular entity 122 that manufactured and/or services the particular ATM unit 120 associated with the ATM ID 162 received as part of the request 186. As described above, execution environments deployed at ATM units 120 manufactured by and/or serviced by different entities 122 may be different (e.g., have different execution attributes 177). An image of each execution environment 176 (e.g., stored in memory 156) includes configuration defined by execution attributes 177 that can be used to replicate a typical software/execution environment deployed at ATM units 120 manufactured by and/or serviced by a particular entity 122. In other words, each image of an execution environment 176 (e.g., stored in memory 156) is associated with ATM units 120 manufactured by and/or serviced by a particular entity 122. In one embodiment, once security manager 150 identifies (e.g., based on inventory hub 160) the entity ID 164 of the particular entity 122 that manufactured and/or services the particular ATM unit 120 that is to be protected, security manager 150 accesses (e.g., from memory 156) the images of the plurality of execution environments 176 and selects a particular execution environment 176 that is associated with ATM units 120 manufactured by and/or serviced by the identified particular entity 122. Essentially, security manager 150 identifies a particular execution environment 176 that is a replica of or at least closely matches a typical execution environment deployed at ATM units 120 manufactured by and/or serviced by the identified particular entity 122.

Security manager 150 may be configured to generate a software package 180 that bundles at least the images of the identified particular AI agent 170, the particular LLM 172, the particular software container 174, and the particular execution environment 176. For example, security manager 150 generates the software package 180 by bundling the updated image of the software container 174 including the particular AI agent 170 and the particular LLM 172, and an image of the particular execution environment 176.

In one or more embodiments, security manager 150 may be configured to deploy the software package 180 at the particular ATM unit 120 requested for protection. For example, security manager 150 may determine a network address 166 of the particular ATM unit 120 from the inventory hub 160 and transmit the software package 180 to the particular ATM unit 120 at its identified network address 166. Once the particular ATM unit 120 has received the software package 180, security manager 150 may be configured to deploy the software package 180 at the particular ATM unit 120.

In one embodiment, security manager 150 may first deploy the particular execution environment 176 from the software package 180 as a virtual machine (VM) 124 at the particular ATM unit 120. For example, security manager 150 may first extract the image of the particular execution environment 176 from the software package 180 and deploy the particular execution environment 176 (from the image) at the particular ATM unit 120 as a VM 124. In one embodiment, security manager 150 may use a hypervisor 126 to generate the VM 124 at the ATM unit 120. A hypervisor (e.g., hypervisor 126), also known as a virtual machine monitor (VMM) is software (or sometimes firmware) that creates and manages virtual machines (VMs) (e.g., VM 124) by allowing multiple operating systems to run simultaneously on a single physical computer (e.g., ATM unit 120). It acts as a control layer between the hardware and the virtual machines, ensuring each VM has isolated access to the system's resources such as CPU, memory, storage, and network interfaces. In essence, the hypervisor 126 abstracts the underlying physical hardware (of the respective ATM unit 120) and presents each virtual machine 124 with its own virtualized hardware environment, making the VM 124 believe it's running on a dedicated physical machine. In one embodiment, security manager 150 executes the hypervisor 126 at the particular ATM unit 120 to generate a VM 124 at the ATM unit 120 based on the configuration (e.g., execution attributes 177) included in the image of the execution environment 176 received as part of the software package 180.

Once the VM 124 has been created at the particular ATM unit 120, security manager 150 may be configured to deploy, in the VM 124, the particular software container 174 received as part of the software package 180. For example, security manager 150 extracts the image of the particular software container 174 (e.g., updated image including the particular AI agent 170 and associated particular LLM 172) from the software package 180 and deploys the particular software container 174 in the VM 124. In one embodiment, security manager 150 uses a container runtime software (e.g., Docker) to launch the particular software container 174 in the VM 124. For example, security manager 150 first installs the container runtime software (not shown) in the VM 124 and then executes the container runtime software to launch the particular software container 174 in the VM 124.

Once the particular software container 174 has been deployed in the VM 124, security manager 150 may execute the particular AI agent 170 and associated particular LLM 172 from particular software container 174 to perform a plurality of tasks at the particular ATM unit 120 associated with protecting the particular ATM unit 120 against the particular unauthorized activity 178.

In some cases, when installing software (e.g., an AI agent 170) at an ATM unit 120, region-specific configuration 182 is often required to ensure compliance with local operational, regulatory, and linguistic requirements. Different regions may use distinct currencies, transaction protocols, and standards, necessitating customized software parameters such as currency denominations, exchange rate handling, and compliance with region-specific messaging standards like ISO 8583 variations. Additionally, regional laws and banking regulations may dictate security protocols, encryption standards, and data privacy measures that must be configured within the ATM software. Language localization is another key factor. For example, user interface text, audio prompts, and error messages must be adapted to the local language and cultural context. Network configurations, including host server addresses, communication ports, and network security certificates, may also differ depending on the financial institution's infrastructure in a particular region. Furthermore, the ATM unit's operational settings, such as time zones, date formats, and holiday calendars, must be configured to align with local conditions to ensure accurate transaction processing and reporting. Thus, region-specific configuration ensures that each ATM operates securely, accurately, and in compliance with the standards and expectations of its geographic and regulatory environment.

In one embodiment, security manager 150 may be configured to add/inject region-specific configuration 182 to the software package 180 that is transmitted to and deployed at the particular ATM unit 120. For example, security manager 150 determines (e.g., from the inventory hub 160) a region 168 where the ATM unit is located. Security manager 150 obtains region-specific configuration 182 associated with ATM units 120 deployed in that region 168 and adds the obtained configuration 182 to the software package 180 that is to be transmitted to the particular ATM unit 120. Security manager may be configured to extract the configuration 182 from the software package 180 and apply the extracted configuration 182 when deploying the software package 180 at the particular ATM unit 120. This ensures that the installed AI agent 170 and associated LLM 172 executes at the ATM unit 120 in accordance with the region-specific configuration 182.

In one or more embodiments, security manager 150 may be configured to deploy software across large numbers of ATM units 120 with heterogeneous execution environments in an efficient, controlled and error free manner. For example, security manager 150 may receive a request 186 to protect/defend a plurality of ATM units 120 against the particular unauthorized activity 178. The request 186 may include ATM IDs 162 associated with the ATM units 120 that need protection from the particular unauthorized activity 178.

In response to receiving the request 186 to protect the plurality of ATM units 120, security manager 150 may be configured to determine which entities 122 manufactured and/or services the ATM units 120 for which the request 186 was received. For example, security manager 150 may access inventory hub 160 and identify an entity ID 164 (associated with a particular entity 122 that manufactured and/or services a particular ATM unit 120) associated with each ATM ID 162 received as part of the request 186. Based on the entity ID(s) 164 identified for each of the ATM units

120, security manager may determine that a first set of ATM units 120 is associated with a first entity ID 164 and a second set of ATM units 120 is associated with a second entity ID 164. In other words, each ATM unit 120 from the first set of ATM units 120 is manufactured by and/or serviced by a first entity 122 identified by the first entity ID 164 and each ATM unit 120 from the second set of ATM units 120 is manufactured by and/or serviced by a second entity 122 identified by the second entity ID 164.

Security manager 150 may be configured to generate two different software packages 180, a first software package 180 for the ATM units 120 in the first set of ATM units 120 and a second software package 180 for the ATM units 120 in the second set of ATM units 120. For example, since all ATM units 120, regardless of the entity 122 they are associated with, are to be protected from the same particular unauthorized activity 178, security manager 150 selects the same particular AI agent 170, particular LLM 172, and particular software container 174 described above. However, since execution environments deployed at ATM units 120 manufactured by and/or serviced by different entities 122 may be different (e.g., have different execution attributes 177), security manager 150 selects a first execution environment 176 associated with ATM units 120 manufactured by and/or serviced by the first entity 122 and selects a second execution environment 176 associated with ATM units 120 manufactured by and/or serviced by the second entity 122.

Security manager 150 may then generate the first software package 180 that bundles the images of the identified particular AI agent 170, the particular LLM 172, the particular software container 174, and the first execution environment 176. For example, security manager 150 generates the first software package 180 by bundling the updated image of the software container 174 including the particular AI agent 170 and the particular LLM 172, and an image of the first execution environment 176. Similarly, security manager 150 may generate the second software package 180 that bundles the images of the identified particular AI agent 170, the particular LLM 172, the particular software container 174, and the second execution environment 176. For example, security manager 150 generates the second software package 180 by bundling the updated image of the software container 174 including the particular AI agent 170 and the particular LLM 172, and an image of the second execution environment 176.

Security manager 150 may extract the network addresses 166 of each ATM unit 120 identified (using respective ATM ID 162) in the request 186. Security manager 150 may then transmit the first software package 180 to each ATM unit 120 from the first set of ATM units 120 at their respective network addresses 166. Essentially, security manager 150 transmits the first software package 180 to each ATM unit 120 that is manufactured by and/or is serviced by the first entity. Similarly, security manager 150 may transmit the second software package 180 to each ATM unit 120 from the second set of ATM units 120 at their respective network addresses 166. Essentially, security manager 150 transmits the second software package 180 to each ATM unit 120 that is manufactured by and/or is services by the second entity. Security manager 150 may be configured to deploy the first software package 180 at each ATM unit 120 from the first set of ATM units 120 and deploy the second software package 180 at each ATM unit 120 from the second set of ATM units 120. Thus, security manager 150 generates and deploys software at each ATM unit 120 that is customized to and compatible with the local execution environment at that ATM unit 120.

Offline Defense for ATMs

In one or more additional or alternative embodiments, security manager 150 may be configured to protect an ATM unit 120 from unauthorized activity even when the ATM unit is not connected to the central server 130. This state of the ATM unit 120 not connected to the central server 130 may be referred to an "offline state" of the ATM unit 120. It may be noted that the term "offline state" does not necessarily mean that the ATM unit 120 has lost all connectivity. An offline state may mean that the ATM unit 120 has lost connectivity to the central server 130 while still connected to other ATM units 120, other servers, the internet etc.

An ATM unit 120 may lose connectivity to a central server (e.g., central bank server) even while remaining connected to the network due to a variety of technical and operational issues. One common reason is a misconfiguration or failure in network routing or Domain Name System (DNS) resolution, which prevents the ATM from correctly identifying or reaching the bank server's IP address despite having an active network link. Firewall or security policy changes either at the ATM's local network, an intermediate gateway, or the bank's data center can also block communication between the ATM and the central server. Additionally, expired or mismatched security certificates may disrupt encrypted communication channels such as SSL/TLS connections, effectively severing logical connectivity while maintaining physical network access. Software glitches or process failures within the ATM's communication module can interrupt message transmission or cause session timeouts. In other cases, the central server 130 itself may be temporarily offline or under maintenance, causing ATMs to fail in establishing sessions. Network congestion, bandwidth throttling, or packet loss at intermediary nodes can further degrade communication quality, resulting in incomplete or dropped transactions. Thus, even when an ATM unit 120 remains online within its local or regional network, various logical, configuration, or security issues can interrupt its ability to maintain a stable connection with the central server 130.

As described above, central server 130 may be responsible to perform several operations (e.g., parameter validations) relating to operations and interactions at an ATM unit 120. For example, central server 130 may be configured to validate certain security-related parameters (e.g., security parameters 184) associated with operation of a defensive AI agent 170 deployed at an ATM unit 120 to protect that ATM unit 120 from an unauthorized activity 178. Central server 130 may play a critical role in validating security-related parameters (e.g., security parameters 184) and detecting or blocking potential attacks against the ATM unit 120. For example, central server 130 validates the cryptographic integrity of software modules, verify the authenticity of firmware versions, or compare operational fingerprints of an ATM unit 120 against known baselines to detect unauthorized modifications. These validations allow a defensive AI agent 170 to determine whether an unauthorized activity 178 has taken place at a respective ATM unit 120 and measures/actions that need to be taken to block and/or avoid an unauthorized activity 178. For example, when suspicious activity is detected, based at least in part on the validations performed by the central server 130, such as unusual transaction sequences, communication with unverified endpoints, or deviations in system behavior, an AI agent 170 can issue commands to restrict access, disable specific functions, or isolate the ATM unit 120 from the network to prevent further compromise.

Thus, communication with the central server 130 may be an integral part of a defensive AI agent 170 performing its operations at an ATM unit 120. Without connectivity to the central server 130, an AI agent 170 deployed at an ATM unit 120 is unable to validate security parameters 184 that are generally validated by the central server 130. This may mean that the AI agent 170 is unable to identify, avoid and block unauthorized activities 178 leaving the ATM unit 120 vulnerable to attacks.

In one or more embodiments, when an ATM unit 120 loses connectivity to the central server 130, security manager 150 may be configured to replicate the behavior of the central server 130 or a portion thereof locally at that ATM unit 120 such that validations otherwise performed by the central server 130 can be performed locally at the ATM unit 120 using the replicated central server 130. This allows defensive AI agents deployed at the ATM unit 120 to perform their respective defensive operations even when the ATM unit 120 has lost connectivity to the central server 130.

An example replication of the central server 130 at a particular ATM unit 120 will not be described. For this example, an assumption is made that the security manager 150 is deployed locally at the ATM unit 120. For example, security manager 150 may be an AI agent locally deployed at the ATM unit 120. However, a person having ordinary skill in the art may appreciate that security manager 150 may be deployed at any other computing node 104 of the computing infrastructure 102 that is in communication with the ATM unit 120 and the central server 130.

In one or more embodiments, security manager 150 may be configured to monitor the central server 130 and record a plurality of execution attributes 177 associated with the software/execution environment at the central server 130, wherein the execution attributes 177 relating to the central server 130 define the execution environment at the central server 130. An execution environment (e.g., execution environment 176) generally provides a context in which an application (e.g., AI agent 170 and associated LLM 172) runs/executes. For example, an execution environment provides hardware (e.g., CPU memory storage etc.), operating system, dependencies and software libraries the application relies on, runtime components and configuration settings (e.g., network settings, database connections etc.) that the application needs to execute correctly. An execution environment 176 may be defined by a plurality of execution attributes 177 that define the components of that execution environment 176 including, but not limited to, the hardware, operating system, dependencies and software libraries, runtime components and configuration settings. Security manager 150 may be configured to record the execution attributes 177 that define the execution environment at the central server 130. In one embodiment, security manager 150 (deployed at the ATM unit 120) monitors the central server 130 when the ATM unit 120 is connected to the central server 130. As described below, security manager 150 may replicate the execution environment of the central server 130 at the ATM unit 120 based on the execution attributes 177 recorded for the central server 130.

Additionally, security manager 150 may record which one or more security parameters 184 are validated by the central server 130 (e.g., for the particular ATM unit 120) and what AI agents 170 are used by the central server 130 to validate each security parameter 184. For example, based on monitoring the central server 130, security manager 150 may determine that central server 130 validates a first security parameter 184 for the ATM unit 120 using a first AI agent 170.

Essentially security manager 150 learns the configuration and behavior of the central server 130 in relation to validating security parameters 184 so that the learned behavior can be used to replicate the central server 130 or a portion thereof in the even the ATM unit 120 loses connectivity with the central server 130. In one embodiment, security manager 150 locally stores (e.g., in memory 156) at the ATM unit 120 the learned behavior of the central server 130 including, but not limited to, the execution attributes 177 associated with the central server 130, the security parameters 184 (e.g., the first security parameter 184) validated by the central server 130, and the respective AI agents 170 (e.g., the first AI agent 170) used by the central server 130 to validate each security parameter 184.

As described above, security manager 150 is configured to store (e.g., in memory 156) or has access to an inventory hub 160, a plurality of AI agents 170 (stored as images of AI agents 170), a plurality of LLMs 172 (stored as images of LLMs 172), a plurality of software containers 174 (stored as images of software containers 174), and a plurality of execution environments 176 (stored as images of execution environments 176).

The images of the AI agents 170 may include a plurality of AI agents 170 that may be deployed at the central server 130 to validate respective security parameters 184. Further, the images of the execution environments 176 may include a set of execution environments 176, wherein each execution environment 176 from the set is associated with (e.g., defined by) a different set of execution attributes 177.

In operation, in response to detecting that the ATM unit 120 has lost connectivity to the central server 130, security manager 150 accesses the stored learned behavior of the central server 130 and determines that the central server 130 validates the first security parameter 184 using the first AI agent 170. Security manager 150 then accesses (e.g., from memory 156) the images of the plurality of AI agents 170 and identifies (from the plurality of AI agents 170), a particular AI agent 170 that is trained/configured to validate the first security parameter 184 which is otherwise validated by the central server 130. In one embodiment, the particular AI agent 170 is same as the first AI agent 170 used by the central server 130 to validate the first security parameter 184.

Once the particular AI agent 170 has been identified, security manager 150 accesses (e.g., from memory 156) the images of the plurality of LLMs 172 and identifies (from the plurality of LLMs 172) a particular LLM 172 that is associated with the identified particular AI agent 170. In other words, security manager 150 identifies the particular LLM 172 that is typically used by the particular AI agent 170 for its operation.

Additionally, security manager 150 accesses (e.g., from memory 156) the images of the plurality of software containers 174 and identifies (from the plurality of software containers 174) a particular software container 174 that includes typical software elements 175 to execute the particular AI agent 170 and associated LLM 172. In one embodiment, security manager 150 generates an updated image of the identified particular software container 174 based on the identified particular AI agent 170 and the particular LLM 172. For example, security manager 150 extracts (e.g., memory 156) an image of the particular AI agent 170, an image of the particular LLM 172 and an image of the particular software container 174. Security manager 150 then generates an updated image of the software container 174 by adding the particular AI agent 170 and the particular LLM 172 to the image of the software container 174.

In addition, security manager 150 may be configured to select (from the plurality of stored images of execution environments 176) a particular execution environment 176 that matches or closely matches the execution environment deployed at the central server 130. For example, based on the learned behavior of the central server 130, security manager 150 identifies the execution attributes 177 that define the execution environment at the central server 130. Security manager 150 identifies (from the images of the execution environments 176) a particular execution environment 176 whose execution attributes 177 are same as or closely match the same execution attributes 177 of the execution environment at the central server 130.

Security manager 150 may be configured to generate a software package 180 that bundles at least the images of the identified particular AI agent 170, the particular LLM 172, the particular software container 174, and the particular execution environment 176. For example, security manager 150 generates the software package 180 by bundling the updated image of the software container 174 including the particular AI agent 170 and the particular LLM 172, and an image of the particular execution environment 176.

In one or more embodiments, security manager 150 may be configured to deploy the software package 180 at the particular ATM unit 120 in response to detecting that the particular ATM unit 120 has lost connectivity to the central server 130. In one embodiment, security manager 150 may first deploy the particular execution environment 176 from the software package 180 as a virtual machine (VM) 124 at the particular ATM unit 120. For example, security manager 150 may first extract the image of the particular execution environment 176 from the software package 180 and deploy the particular execution environment 176 (from the image) at the particular ATM unit 120 as a VM 124. In one embodiment, security manager 150 may use a hypervisor 126 to generate the VM 124 at the ATM unit 120. For example, security manager 150 executes the hypervisor 126 at the particular ATM unit 120 to generate a VM 124 at the ATM unit 120 based on the configuration (e.g., execution attributes 177) included in the image of the execution environment 176 received as part of the software package 180. The VM 124 mimics or replicates, locally at the ATM unit 120, the execution environment of the central server 130.

Once the VM 124 has been created at the particular ATM unit 120, security manager 150 may be configured to deploy, in the VM 124, the particular software container 174 received as part of the software package 180. For example, security manager 150 extracts the image of the particular software container 174 (e.g., updated image including the particular AI agent 170 and associated particular LLM 172) from the software package 180 and deploys the particular software container 174 in the VM 124. In one embodiment, security manager 150 uses a container runtime software (e.g., Docker) to launch the particular software container 174 in the VM 124. For example, security manager 150 first installs the container runtime software (not shown) in the VM 124 and then executes the container runtime software to launch the particular software container 174 in the VM 124.

Once the particular software container 174 has been installed in the VM 124, security manager 150 may be configured to execute the particular AI agent 170 and the associated particular LLM 172 in the VM 124 to mimic or replicate (e.g., locally at the ATM unit 120) the operation of the central server 130 in relation to validation of the first security parameter 184. This allows a defensive AI agent 170 operating at the ATM unit 120 to receive validations of the first security parameter 184 using the particular AI agent 170 deployed in the VM 124 that locally mimics operation of the central server 130. This allows defensive AI agents 170 to operate at the ATM unit 120 even when the ATM unit 120 has lost connectivity with the central server 130, ensuring that the ATM unit 120 is protected against unauthorized activity 178.

In alternative or additional embodiments, security manager 150 may be deployed at a server (e.g., cloud server) that is communicatively connected to a plurality of ATM units 120. In this embodiment, an ATM unit 120 may loose connectivity with the central server 130 but may still be connected to the server (e.g., cloud server) that hosts the security manager 150. This setup allows the security manager 150 to deploy a software package 180 at a plurality of ATM units 120 in case multiple ATM units 120 loose connectivity to the central server 130 (for example, multiple ATM units in a region loose connectivity to the central server 130).

For example, security manager 150 may detect that a plurality of ATM units 120 have lost connectivity to the central server 130. In one embodiment, security manager 150 may detect that all ATM units 120 deployed in a particular region have lost connectivity to the central server 130. In response to detecting that a plurality of ATM units 120 have lost connectivity to the central server 130, security manager 150 may determine network addresses 166 of the ATM units 120 from the inventory hub 160 and transmit a copy of the software package 180 to each of the ATM unit 120 at their respective identified network addresses 166. Once each ATM unit 120 has received the software package 180, security manager 150 may be configured to deploy the software package 180 at the that ATM unit 120 as described above to replicate the central server 130 that that ATM unit 120 to allow defensive AI agents 170 to run even when there is no connectivity to the central server 130.

In one or more embodiments, security manager 150 may be configured to switch back the ATM unit 120 to performing validations at the central server 130 in response to detecting that connectivity between the ATM unit 120 and the central server 130 is restored. For example, in response to determining that the connectivity to the central server 130 is restored, security manager 150 disables the VM 124 and causes validations of the first security parameter 184 to occur at the central server 130.

Figure 2:
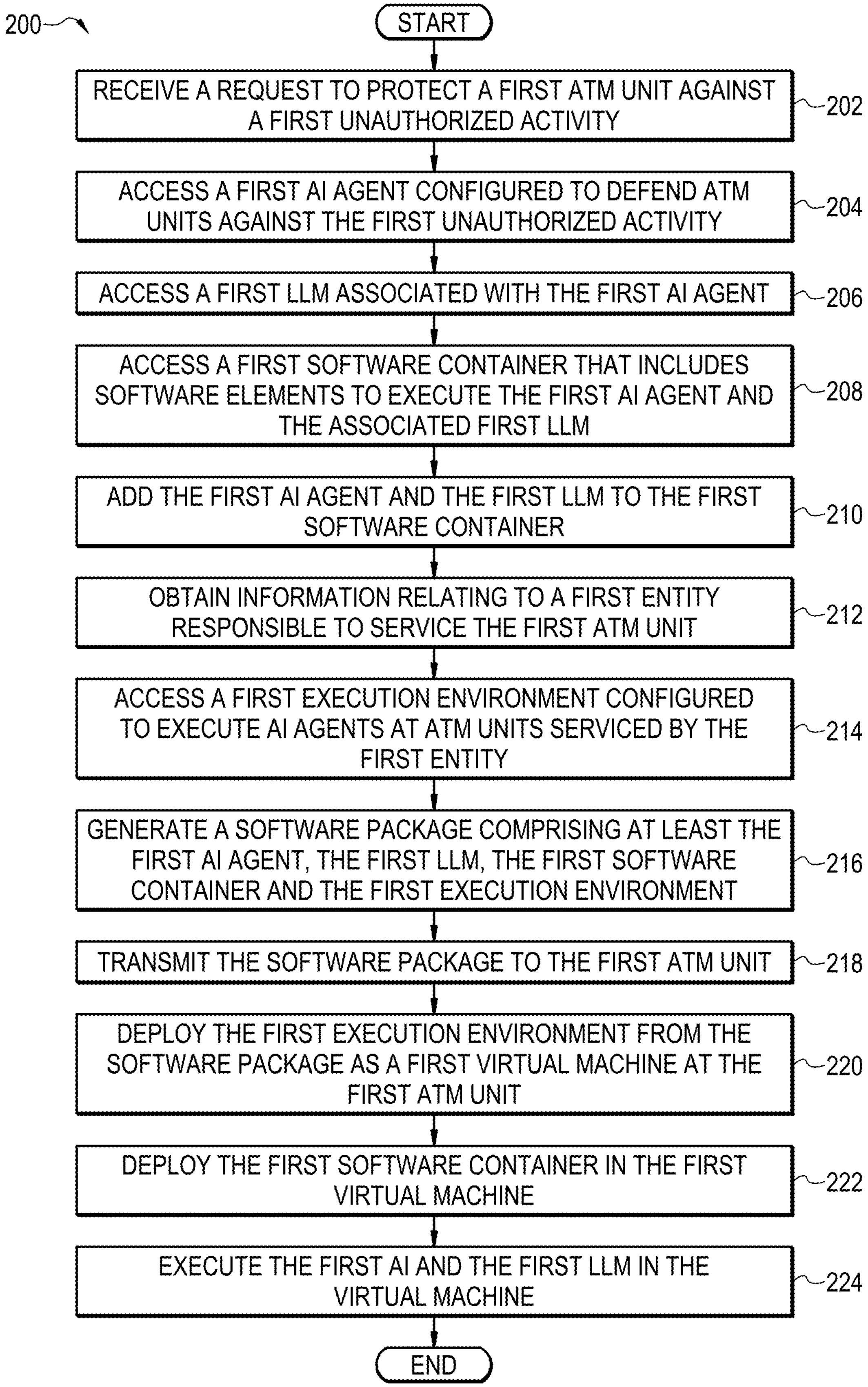
FIG. 2 illustrates an example method to deploy software at an ATM unit, in accordance with one or more embodiments of the present disclosure.

FIG. 2 illustrates an example method 200 to deploy software at an ATM unit, in accordance with one or more embodiments of the present disclosure. Method 200 may be performed by the security manager 150 shown in FIG. 1.

At operation 202, security manager 150 receives a request 186 to protect a first ATM unit 120 against a first unauthorized activity 178.

As described above, security manager 150 may be configured to receive requests 186 to protect/defend one or more ATM units 120 against particular unauthorized activities 178. A request 186 may be machine-generated or user-generated. For example, security manager 150 may receive a request 186 to protect a particular ATM unit 120 against a particular unauthorized activity 178. The particular unauthorized activity 178 may be a particular type of software breach, malware injection, or hardware attack (e.g., a new type of skimmer) the particular ATM unit 120 is found vulnerable to.

At operation 204, security manager 150 accesses, from the plurality of AI agents 170, a first AI agent 170 configured to defend ATM units 120 against the first unauthorized activity 178.

As described above, in response to receiving the request 186 to protect the particular ATM unit 120 against the particular unauthorized activity 178, security manager 150 accesses (e.g., from memory 156) the images of the plurality of AI agents 170 and identifies (from the plurality of AI agents 170), a particular AI agent 170 that is trained/configured to defend/protect ATM units 120 against the particular unauthorized activity 178 indicated in the request 186.

At operation 206, security manager 150 accesses, from the plurality of LLMs 172, a first LLM 172 associated with the first AI agent 170.

As described above, once the particular AI agent 170 has been identified, security manager 150 accesses (e.g., from memory 156) the images of the plurality of LLMs 172 and identifies (from the plurality of LLMs 172) a particular LLM 172 that is associated with the identified particular AI agent 170. In other words, security manager 150 identifies the particular LLM 172 that is typically used by the particular AI agent 170 for its operation.

At operation 208, security manager 150 accesses, from the plurality of software containers 174, a first software container 174 that comprises software elements 175 to execute the first AI agent 170 and the associated first LLM 172.

At operation 210, security manager 150 adds the first AI agent 170 and the first LLM 172 to the first software container 174.

As described above, security manager 150 accesses (e.g., from memory 156) the images of the plurality of software containers 174 and identifies (from the plurality of software containers 174) a particular software container 174 that includes typical software elements 175 to execute the particular AI agent 170 and associated LLM 172. In one embodiment, security manager 150 generates an updated image of the identified particular software container 174 based on the identified particular AI agent 170 and the particular LLM 172. For example, security manager 150 extracts (e.g., memory 156) an image of the particular AI agent 170, an image of the particular LLM 172 and an image of the particular software container 174. Security manager 150 then generates an updated image of the software container 174 by adding the particular AI agent 170 and the particular LLM 172 to the image of the software container 174.

At operation 212, security manager 150 obtains information relating to a first entity 122 responsible to service the first ATM unit 120.

At operation 214, security manager 150 accesses, from the plurality of execution environments 176, a first execution environment 176 configured to execute AI agents 170 at ATM units 120 serviced by the first entity 122.

As described above, security manager 150 may determine which entity manufactured and/or services the particular ATM unit 120 for which the request 186 was received. For example, the request 186 may include an ATM ID 162 of the particular ATM unit 120 that is to be protected. Security manager 150 may access inventory hub 160 and identify an entity ID 164 associated with a particular entity 122 that manufactured and/or services the particular ATM unit 120 associated with the ATM ID 162 received as part of the request 186. Once security manager 150 identifies (e.g., based on inventory hub 160) the entity ID 164 of the particular entity 122 that manufactured and/or services the particular ATM unit 120 that is to be protected, security manager 150 accesses (e.g., from memory 156) the images of the plurality of execution environments 176 and selects a particular execution environment 176 that is associated with ATM units 120 manufactured by and/or serviced by the identified particular entity 122. Essentially, security manager 150 identifies a particular execution environment 176 that is a replica of or at least closely matches a typical execution environment deployed at ATM units 120 manufactured by and/or serviced by the identified particular entity 122.

At operation 216, security manager 150 generates a software package 180 comprising at least the first AI agent 170, the first LLM 172, the first software container 174, and the first execution environment 176.

As described above, security manager 150 may be configured to generate a software package 180 that bundles at least the images of the identified particular AI agent 170, the particular LLM 172, the particular software container 174, and the particular execution environment 176. For example, security manager 150 generates the software package 180 by bundling the updated image of the software container 174 including the particular AI agent 170 and the particular LLM 172, and an image of the particular execution environment 176.

At operation 218, security manager 150 transmits the software package 180 to the first ATM unit 120.

At operation 220, security manager 150 deploys the first execution environment 176 from the software package 180 as a first virtual machine 124 at the first ATM unit 120.

At operation 222, security manager 150 deploys, in the first virtual machine 124, the first software container 174 comprising the first AI agent 170 and the first LLM 172.

As described above, security manager 150 may be configured to deploy the software package 180 at the particular ATM unit 120 requested for protection. For example, security manager 150 may determine a network address 166 of the particular ATM unit 120 from the inventory hub 160 and transmit the software package 180 to the particular ATM unit 120 at its identified network address 166. Once the particular ATM unit 120 has received the software package 180, security manager 150 may be configured to deploy the software package 180 at the particular ATM unit 120.

In one embodiment, security manager 150 may first deploy the particular execution environment 176 from the software package 180 as a virtual machine (VM) 124 at the particular ATM unit 120. For example, security manager 150 may first extract the image of the particular execution environment 176 from the software package 180 and deploy the particular execution environment 176 (from the image) at the particular ATM unit 120 as a VM 124. In one embodiment, security manager 150 may use a hypervisor 126 to generate the VM 124 at the ATM unit 120. A hypervisor (e.g., hypervisor 126), also known as a virtual machine monitor (VMM) is software (or sometimes firmware) that creates and manages virtual machines (VMs) (e.g., VM 124) by allowing multiple operating systems to run simultaneously on a single physical computer (e.g., ATM unit 120). It acts as a control layer between the hardware and the virtual machines, ensuring each VM has isolated access to the system's resources such as CPU, memory, storage, and network interfaces. In essence, the hypervisor 126 abstracts the underlying physical hardware (of the respective ATM unit 120) and presents each virtual machine 124 with its own virtualized hardware environment, making the VM 124 believe it's running on a dedicated physical machine. In one embodiment, security manager 150 executes the hypervisor 126 at the particular ATM unit 120 to generate a VM 124 at the ATM unit 120 based on the configuration (e.g., execution attributes 177) included in the image of the execution environment 176 received as part of the software package 180.

Once the VM 124 has been created at the particular ATM unit 120, security manager 150 may be configured to deploy, in the VM 124, the particular software container 174 received as part of the software package 180. For example, security manager 150 extracts the image of the particular software container 174 (e.g., updated image including the particular AI agent 170 and associated particular LLM 172) from the software package 180 and deploys the particular software container 174 in the VM 124. In one embodiment, security manager 150 uses a container runtime software (e.g., Docker) to launch the particular software container 174 in the VM 124. For example, security manager 150 first installs the container runtime software (not shown) in the VM 124 and then executes the container runtime software to launch the particular software container 174 in the VM 124.

At operation 224, security manager 150 executes the first AI agent 170 and the first LLM 172 from the first software container 174 in the first virtual machine 124 to perform a plurality of tasks at the first ATM unit 120 associated with protecting the first ATM unit 120 against the first unauthorized activity 178.

As described above, once the particular software container 174 has been deployed in the VM 124, security manager 150 may execute the particular AI agent 170 and associated particular LLM 172 from particular software container 174 to perform a plurality of tasks at the particular ATM unit 120 associated with protecting the particular ATM unit 120 against the particular unauthorized activity 178.

Figure 3A:
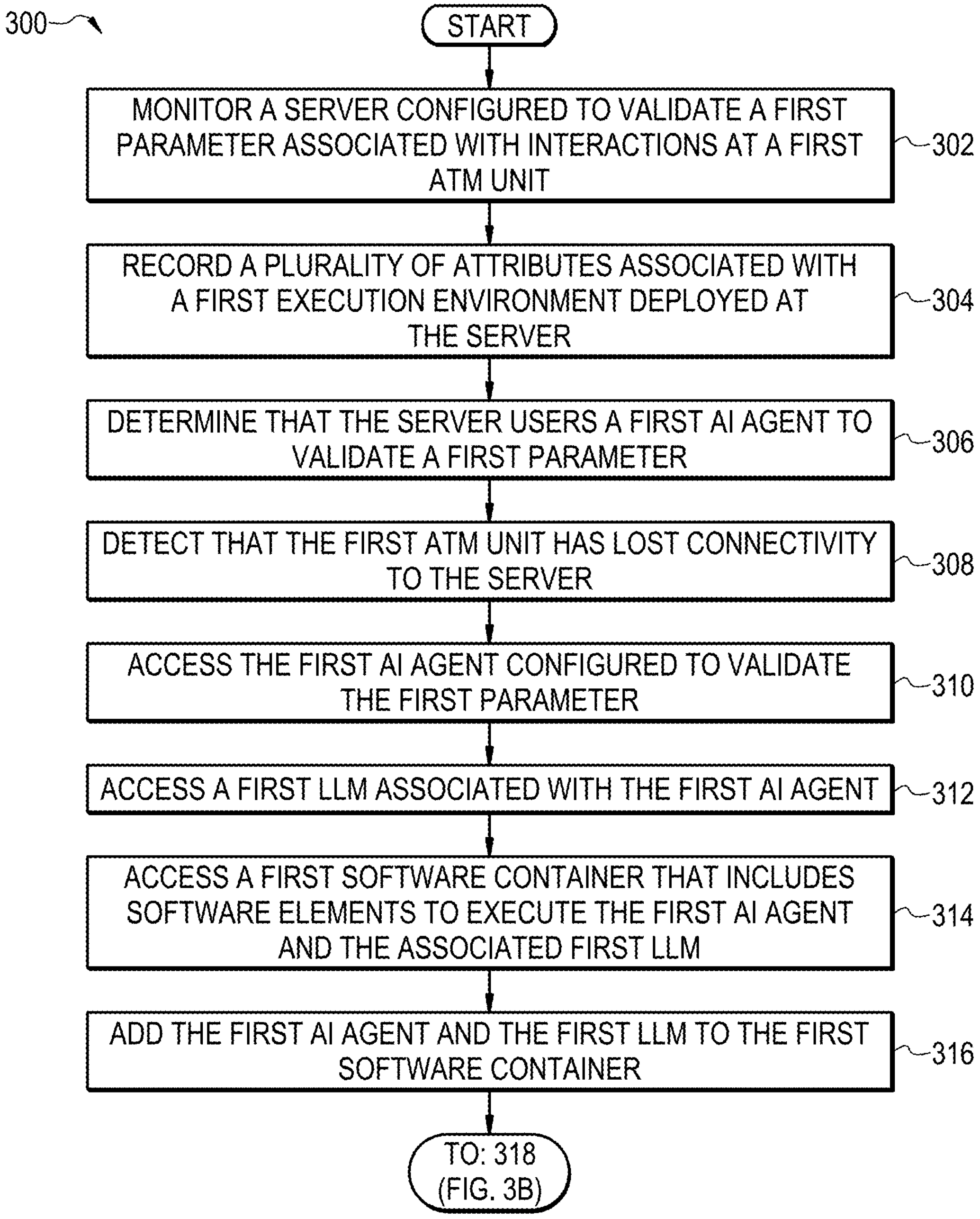
FIGS. 3A and 3B illustrate an example method to defend an ATM from unauthorized activity when not connected to a central server, in accordance with one or more embodiments of the present disclosure
Figure 3B:
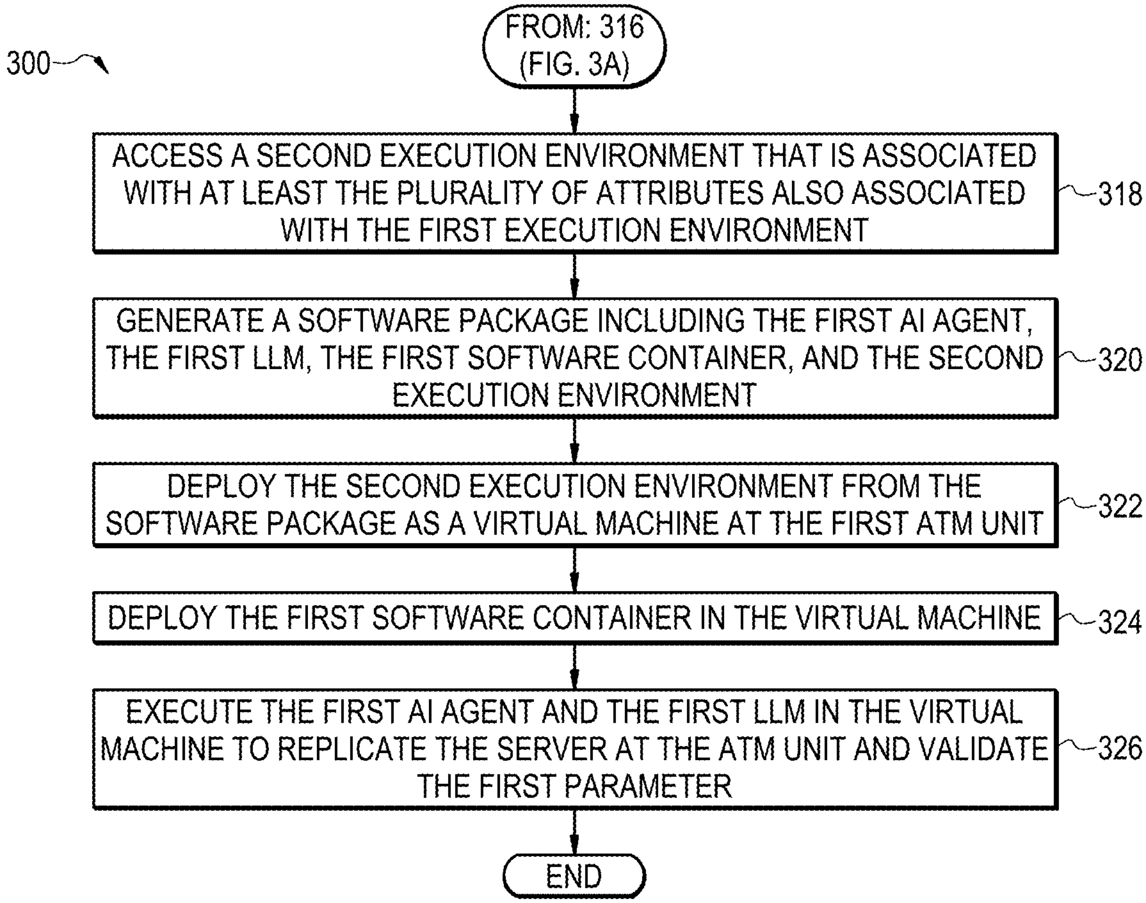

FIGS. 3A and 3B illustrate an example method 300 to defend an ATM from unauthorized activity when not connected to a central server, in accordance with one or more embodiments of the present disclosure. Method 300 may be performed by the security manager 150 shown in FIG. 1.

Referring to FIG. 3A at operation 302, security manager 150 monitors a server (e.g., central server 130) configured to validate a first parameter (e.g., security parameter 184) associated with interactions at a first ATM unit 120.

At operation 304, security manager 150 records, based on the monitoring, a plurality of attributes (e.g., execution attributes 177) associated with a first execution environment 176 deployed at the server (e.g., central server 130), wherein the plurality of attributes identify a combination of hardware and software resources deployed by the first execution environment 176.

As described above, security manager 150 may be configured to monitor the central server 130 and record a plurality of execution attributes 177 associated with the software/execution environment at the central server 130, wherein the execution attributes 177 relating to the central server 130 define the execution environment at the central server 130. An execution environment (e.g., execution environment 176) generally provides a context in which an application (e.g., AI agent 170 and associated LLM 172) runs/executes. For example, an execution environment provides hardware (e.g., CPU memory storage etc.), operating system, dependencies and software libraries the application relies on, runtime components and configuration settings (e.g., network settings, database connections etc.) that the application needs to execute correctly. An execution environment 176 may be defined by a plurality of execution attributes 177 that define the components of that execution environment 176 including, but not limited to, the hardware, operating system, dependencies and software libraries, runtime components and configuration settings. Security manager 150 may be configured to record the execution attributes 177 that define the execution environment at the central server 130. In one embodiment, security manager 150 (deployed at the ATM unit 120) monitors the central server 130 when the ATM unit 120 is connected to the central server 130. As described below, security manager 150 may replicate the execution environment of the central server 130 at the ATM unit 120 based on the execution attributes 177 recorded for the central server 130.

At operation 306, security manager 150 determines, based on the monitoring, that the server (e.g., central server 130) uses a first AI agent 170 to validate the first parameter (e.g., security parameter 184).

As described above, security manager 150 may record which one or more security parameters 184 are validated by the central server 130 (e.g., for the particular ATM unit 120) and what AI agents 170 are used by the central server 130 to validate each security parameter 184. For example, based on monitoring the central server 130, security manager 150 may determine that central server 130 validates a first security parameter 184 for the ATM unit 120 using a first AI agent 170.

Essentially security manager 150 learns the configuration and behavior of the central server 130 in relation to validating security parameters 184 so that the learned behavior can be used to replicate the central server 130 or a portion thereof in the even the ATM unit 120 loses connectivity with the central server 130. In one embodiment, security manager 150 locally stores (e.g., in memory 156) at the ATM unit 120 the learned behavior of the central server 130 including, but not limited to, the execution attributes 177 associated with the central server 130, the security parameters 184 (e.g., the first security parameter 184) validated by the central server 130, and the respective AI agents 170 (e.g., the first AI agent 170) used by the central server 130 to validate each security parameter 184.

At operation 308, security manager 150 detects that the first ATM unit 120 has lost connectivity to the server (e.g., central server 130).

At operation 310, in response to detecting that the first ATM unit 120 has lost connectivity to the server (e.g., central server 130), security manager 150 accesses, from the plurality of AI agents 170, the first AI agent 170 configured to validate the first parameter (e.g., security parameter 184).

As described above, in response to detecting that the ATM unit 120 has lost connectivity to the central server 130, security manager 150 accesses the stored learned behavior of the central server 130 and determines that the central server 130 validates the first security parameter 184 using the first AI agent 170. Security manager 150 then accesses (e.g., from memory 156) the images of the plurality of AI agents 170 and identifies (from the plurality of AI agents 170), a particular AI agent 170 that is trained/configured to validate the first security parameter 184 which is otherwise validated by the central server 130. In one embodiment, the particular AI agent 170 is same as the first AI agent 170 used by the central server 130 to validate the first security parameter 184.

At operation 312, security manager 150 accesses, from the plurality of LLMs 172, a first LLM 172 associated with the first AI agent 170.

As described above, once the particular AI agent 170 has been identified, security manager 150 accesses (e.g., from memory 156) the images of the plurality of LLMs 172 and identifies (from the plurality of LLMs 172) a particular LLM 172 that is associated with the identified particular AI agent 170. In other words, security manager 150 identifies the particular LLM 172 that is typically used by the particular AI agent 170 for its operation.

At operation 314, security manager 150 access, from the plurality of software containers 174, a first software container 174 that comprises software elements 175 to execute the first AI agent 170 and the associated first LLM 172.

At operation 316, security manager 150 adds the first AI agent 170 and the first LLM 172 to the first software container 174.

As described above, security manager 150 accesses (e.g., from memory 156) the images of the plurality of software containers 174 and identifies (from the plurality of software containers 174) a particular software container 174 that includes typical software elements 175 to execute the particular AI agent 170 and associated LLM 172. In one embodiment, security manager 150 generates an updated image of the identified particular software container 174 based on the identified particular AI agent 170 and the particular LLM 172. For example, security manager 150 extracts (e.g., memory 156) an image of the particular AI agent 170, an image of the particular LLM 172 and an image of the particular software container 174. Security manager 150 then generates an updated image of the software container 174 by adding the particular AI agent 170 and the particular LLM 172 to the image of the software container 174.

Referring to FIG. 3B, at operation 318, security manager 150 accesses, from the plurality of execution environments 176, a second execution environment 176 that is associated at least with the plurality of attributes (e.g., execution attributes 177) also associated with the first execution environment 176 deployed at the server (e.g., central server 130).

As described above, security manager 150 may be configured to select (from the plurality of stored images of execution environments 176) a particular execution environment 176 that matches or closely matches the execution environment deployed at the central server 130. For example, based on the learned behavior of the central server 130, security manager 150 identifies the execution attributes 177 that define the execution environment at the central server 130. Security manager 150 identifies (from the images of the execution environments 176) a particular execution environment 176 whose execution attributes 177 are same as or closely match the same execution attributes 177 of the execution environment at the central server 130.

At operation 320, security manager 150 generates a software package 180 comprising at least the first AI agent 170, the first LLM 172, the first software container 174, and the second execution environment 176.

As described above, security manager 150 may be configured to generate a software package 180 that bundles at least the images of the identified particular AI agent 170, the particular LLM 172, the particular software container 174, and the particular execution environment 176. For example, security manager 150 generates the software package 180 by bundling the updated image of the software container 174 including the particular AI agent 170 and the particular LLM 172, and an image of the particular execution environment 176.

At operation 322, security manager 150 deploys the second execution environment 176 from the software package 180 as a virtual machine 124 at the first ATM unit 120.

At operation 324, security manager 150 deploys, in the virtual machine 124, the first software container 174 comprising the first AI agent 170 and the first LLM 172.

As described above, security manager 150 may be configured to deploy the software package 180 at the particular ATM unit 120 in response to detecting that the particular ATM unit 120 has lost connectivity to the central server 130. In one embodiment, security manager 150 may first deploy the particular execution environment 176 from the software package 180 as a virtual machine (VM) 124 at the particular ATM unit 120. For example, security manager 150 may first extract the image of the particular execution environment 176 from the software package 180 and deploy the particular execution environment 176 (from the image) at the particular ATM unit 120 as a VM 124. In one embodiment, security manager 150 may use a hypervisor 126 to generate the VM 124 at the ATM unit 120. For example, security manager 150 executes the hypervisor 126 at the particular ATM unit 120 to generate a VM 124 at the ATM unit 120 based on the configuration (e.g., execution attributes 177) included in the image of the execution environment 176 received as part of the software package 180. The VM 124 mimics or replicates, locally at the ATM unit 120, the execution environment of the central server 130.

Once the VM 124 has been created at the particular ATM unit 120, security manager 150 may be configured to deploy, in the VM 124, the particular software container 174 received as part of the software package 180. For example, security manager 150 extracts the image of the particular software container 174 (e.g., updated image including the particular AI agent 170 and associated particular LLM 172) from the software package 180 and deploys the particular software container 174 in the VM 124. In one embodiment, security manager 150 uses a container runtime software (e.g., Docker) to launch the particular software container 174 in the VM 124. For example, security manager 150 first installs the container runtime software (not shown) in the VM 124 and then executes the container runtime software to launch the particular software container 174 in the VM 124.

At operation 326, security manager 150 executes the first AI agent 170 and the first LLM 172 from the first software container 174 in the virtual machine 124 to replicate operation of the server (e.g., central server 130) at the first ATM unit 120 and validate the first parameter (e.g., security parameter 184) associated with interactions at the first ATM unit 120.

As described above, once the particular software container 174 has been installed in the VM 124, security manager 150 may be configured to execute the particular AI agent 170 and the associated particular LLM 172 in the VM 124 to mimic or replicate (e.g., locally at the ATM unit 120) the operation of the central server 130 in relation to validation of the first security parameter 184. This allows a defensive AI agent 170 operating at the ATM unit 120 to receive validations of the first security parameter 184 using the particular AI agent 170 deployed in the VM 124 that locally mimics operation of the central server 130. This allows defensive AI agents 170 to operate at the ATM unit 120 even when the ATM unit 120 has lost connectivity with the central server 130, ensuring that the ATM unit 120 is protected against unauthorized activity 178.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words “means for” or “step for” are explicitly used in the particular claim.

The invention claimed is:

1. A system comprising:

a memory configured to store:

a plurality of Artificial Intelligence (AI) agents, wherein each AI agent is configured to validate a particular parameter associated with interactions at an Automated Teller Machine (ATM) unit;

a plurality of Large Language Models (LLMs), wherein each AI agent is associated with a particular LLM;

a plurality of software containers, wherein each software container comprises software elements needed to execute a particular AI agent and an associated LLM; and a plurality of execution environments, wherein each execution environment is associated with a different set of attributes, wherein attributes associated with a particular execution environment specify hardware and software resources deployed by the particular execution environment; and a processor communicatively coupled to the memory and configured to:

monitor a server configured to validate a first parameter associated with interactions at a first ATM unit;

record, based on the monitoring, a plurality of attributes associated with a first execution environment deployed at the server, wherein the plurality of attributes identify a combination of hardware and software resources deployed by the first execution environment;

determine, based on the monitoring, that the server uses a first AI agent to validate the first parameter;

detect that the first ATM unit has lost connectivity to the server;

in response to detecting that the first ATM unit has lost connectivity to the server:

access, from the plurality of AI agents, the first AI agent configured to validate the first parameter;

access, from the plurality of LLMs, a first LLM associated with the first AI agent;

access, from the plurality of software containers, a first software container that comprises software elements to execute the first AI agent and the associated first LLM;

add the first AI agent and the first LLM to the first software container;

access, from the plurality of execution environments, a second execution environment that is associated at least with the plurality of attributes also associated with the first execution environment deployed at the server;

generate a software package comprising at least the first AI agent, the first LLM, the first software container, and the second execution environment;

deploy the second execution environment from the software package as a virtual machine at the first ATM unit;

deploy, in the virtual machine, the first software container comprising the first AI agent and the first LLM; and execute the first AI agent and the first LLM from the first software container in the virtual machine to:

replicate operation of the server at the first ATM unit; and validate the first parameter associated with interactions at the first ATM unit.

2. The system of claim 1, wherein the memory is further configured to store an inventory hub that comprises a list of a plurality of ATM units and a network address of each ATM unit.

3. The system of claim 2, wherein the processor is further configured to:

detect that a plurality of ATM units have lost connectivity to the server;

determine, from the inventory hub, a network address of each ATM unit of the plurality of ATM units;

in response to detecting that the plurality of ATM units have lost connectivity to the server:

transmit the software package at the network address of each ATM unit of the plurality of ATM units;

for each ATM unit of the plurality of ATM units:

deploy the second execution environment from the software package as the virtual machine at that ATM unit;

deploy, in the virtual machine, the first container comprising the first AI agent and the first LLM; and execute the first AI agent and the first LLM from the first container in the virtual machine to:

replicate operation of the server at the that ATM unit; and validate the first parameter associated with interactions at that ATM unit.

4. The system of claim 1, wherein the processor is further configured to:

detect that connectivity between the first ATM and the server is restored;

in response to detecting that connectivity between the first ATM and the server is restored:

disable the virtual machine; and cause validations of the first parameter associated with interactions at the first ATM unit to be performed by the server.

5. The system of claim 1, wherein the processor is further configured to:

after deploying, in the virtual machine, the first container comprising the first AI agent and the first LLM:

execute a second AI agent at the first ATM unit, wherein the second AI agent is configured to protect the first ATM unit against a particular unauthorized activity at the first ATM; and execute the first AI agent and the first LLM in the virtual machine at the first ATM unit to validate the first parameter associated with operation of the second AI agent.

6. The system of claim 1, wherein the processor is further configured to:

launch a hypervisor software at the first ATM unit, wherein the hypervisor software is configured to generate virtual machines at the first ATM unit; and execute the hypervisor software to generate the virtual machine at the first ATM unit.

7. The system of claim 1, wherein information relating to the plurality of AI agents, the plurality of LLMs, the plurality of software containers, and the plurality of execution environments is stored in a cloud server.

8. A method comprising:

monitoring a server configured to validate a first parameter associated with interactions at a first ATM unit;

recording, based on the monitoring, a plurality of attributes associated with a first execution environment deployed at the server, wherein the plurality of attributes identify a combination of hardware and software resources deployed by the first execution environment;

determining, based on the monitoring, that the server uses a first AI agent to validate the first parameter;

detecting that the first ATM unit has lost connectivity to the server;

in response to detecting that the first ATM unit has lost connectivity to the server:

accessing, from a plurality of AI agents, the first AI agent configured to validate the first parameter, wherein each AI agent of the plurality of AI agents is configured to validate a particular parameter associated with interactions at an Automated Teller Machine (ATM) unit;

accessing, from a plurality of LLMs, a first LLM associated with the first AI agent, wherein each AI agent is associated with a particular LLM of the plurality of LLMs;

accessing, from a plurality of software containers, a first software container that comprises software elements to execute the first AI agent and the associated first LLM, wherein each software container of the plurality of software containers comprises software elements needed to execute a particular AI agent and an associated LLM;

adding the first AI agent and the first LLM to the first software container;

accessing, from a plurality of execution environments, a second execution environment that is associated at least with the plurality of attributes also associated with the first execution environment deployed at the server, wherein each execution environment of the plurality of execution environments is associated with a different set of attributes, wherein attributes associated with a particular execution environment specify hardware and software resources deployed by the particular execution environment;

generating a software package comprising at least the first AI agent, the first LLM, the first software container, and the second execution environment;

deploying the second execution environment from the software package as a virtual machine at the first ATM unit;

deploying, in the virtual machine, the first software container comprising the first AI agent and the first LLM; and executing the first AI agent and the first LLM from the first software container in the virtual machine to:

replicate operation of the server at the first ATM unit; and validate the first parameter associated with interactions at the first ATM unit.

9. The method of claim 8, further comprising storing an inventory hub in a memory that comprises a list of a plurality of ATM units and a network address of each ATM unit.

10. The method of claim 9, further comprising:

detecting that a plurality of ATM units have lost connectivity to the server;

determining, from the inventory hub, a network address of each ATM unit of the plurality of ATM units;

in response to detecting that the plurality of ATM units have lost connectivity to the server:

transmitting the software package at the network address of each ATM unit of the plurality of ATM units;

for each ATM unit of the plurality of ATM units:

deploying the second execution environment from the software package as the virtual machine at that ATM unit;

deploying, in the virtual machine, the first container comprising the first AI agent and the first LLM; and executing the first AI agent and the first LLM from the first container in the virtual machine to:

replicating operation of the server at the that ATM unit; and validating the first parameter associated with interactions at that ATM unit.

11. The method of claim 8, further comprising:

detecting that connectivity between the first ATM and the server is restored;

in response to detecting that connectivity between the first ATM and the server is restored:

disabling the virtual machine; and causing validations of the first parameter associated with interactions at the first ATM unit to be performed by the server.

12. The method of claim 8, further comprising:

after deploying, in the virtual machine, the first container comprising the first AI agent and the first LLM:

executing a second AI agent at the first ATM unit, wherein the second AI agent is configured to protect the first ATM unit against a particular unauthorized activity at the first ATM; and executing the first AI agent and the first LLM in the virtual machine at the first ATM unit to validate the first parameter associated with operation of the second AI agent.

13. The method of claim 8, further comprising:

launching a hypervisor software at the first ATM unit, wherein the hypervisor software is configured to generate virtual machines at the first ATM unit; and executing the hypervisor software to generate the virtual machine at the first ATM unit.

14. The method of claim 8, wherein information relating to the plurality of AI agents, the plurality of LLMs, the plurality of software containers, and the plurality of execution environments is stored in a cloud server.

15. A non-transitory computer-readable medium storing instructions that when executed by a processor cause the processor to:

monitor a server configured to validate a first parameter associated with interactions at a first ATM unit;

record, based on the monitoring, a plurality of attributes associated with a first execution environment deployed at the server, wherein the plurality of attributes identify a combination of hardware and software resources deployed by the first execution environment;

determine, based on the monitoring, that the server uses a first AI agent to validate the first parameter;

detect that the first ATM unit has lost connectivity to the server;

in response to detecting that the first ATM unit has lost connectivity to the server:

access, from a plurality of AI agents, the first AI agent configured to validate the first parameter, wherein each AI agent of the plurality of AI agents is configured to validate a particular parameter associated with interactions at an Automated Teller Machine (ATM) unit;

access, from a plurality of LLMs, a first LLM associated with the first AI agent, wherein each AI agent is associated with a particular LLM of the plurality of LLMs;

access, from a plurality of software containers, a first software container that comprises software elements to execute the first AI agent and the associated first LLM, wherein each software container of the plurality of software containers comprises software elements needed to execute a particular AI agent and an associated LLM;

add the first AI agent and the first LLM to the first software container;

access, from a plurality of execution environments, a second execution environment that is associated at least with the plurality of attributes also associated with the first execution environment deployed at the server, wherein each execution environment of the plurality of execution environments is associated with a different set of attributes, wherein attributes associated with a particular execution environment specify hardware and software resources deployed by the particular execution environment;

generate a software package comprising at least the first AI agent, the first LLM, the first software container, and the second execution environment;

deploy the second execution environment from the software package as a virtual machine at the first ATM unit;

deploy, in the virtual machine, the first software container comprising the first AI agent and the first LLM; and execute the first AI agent and the first LLM from the first software container in the virtual machine to:

replicate operation of the server at the first ATM unit; and validate the first parameter associated with interactions at the first ATM unit.

16. The non-transitory computer-readable medium of claim 15, wherein the instructions further cause the processor to store in a memory an inventory hub that comprises a list of a plurality of ATM units and a network address of each ATM unit.

17. The non-transitory computer-readable medium of claim 16, wherein the instructions further cause the processor to:

detect that a plurality of ATM units have lost connectivity to the server;

determine, from the inventory hub, a network address of each ATM unit of the plurality of ATM units;

in response to detecting that the plurality of ATM units have lost connectivity to the server:

transmit the software package at the network address of each ATM unit of the plurality of ATM units;

for each ATM unit of the plurality of ATM units:

deploy the second execution environment from the software package as the virtual machine at that ATM unit;

deploy, in the virtual machine, the first container comprising the first AI agent and the first LLM; and execute the first AI agent and the first LLM from the first container in the virtual machine to:

replicate operation of the server at the that ATM unit; and validate the first parameter associated with interactions at that ATM unit.

18. The non-transitory computer-readable medium of claim 15, wherein the instructions further cause the processor to:

detect that connectivity between the first ATM and the server is restored;

in response to detecting that connectivity between the first ATM and the server is restored:

disable the virtual machine; and cause validations of the first parameter associated with interactions at the first ATM unit to be performed by the server.

19. The non-transitory computer-readable medium of claim 15, wherein the instructions further cause the processor to:

after deploying, in the virtual machine, the first container comprising the first AI agent and the first LLM:

execute a second AI agent at the first ATM unit, wherein the second AI agent is configured to protect the first ATM unit against a particular unauthorized activity at the first ATM; and execute the first AI agent and the first LLM in the virtual machine at the first ATM unit to validate the first parameter associated with operation of the second AI agent.

20. The non-transitory computer-readable medium of claim 15, wherein the instructions further cause the processor to:

launch a hypervisor software at the first ATM unit, wherein the hypervisor software is configured to generate virtual machines at the first ATM unit; and execute the hypervisor software to generate the virtual machine at the first ATM unit.

* * * * *